United States Patent [19]

Berglund

[11] 4,325,249
[45] Apr. 20, 1982

[54] SELF-STABILIZING PNEUMATIC POSITION SENSOR

[76] Inventor: Per R. Berglund, Musserongatan 18, S-13534 Tyresö, Sweden

[21] Appl. No.: 116,646

[22] Filed: Jan. 29, 1980

[30] Foreign Application Priority Data

Jan. 30, 1979 [SE] Sweden ............................ 7900795

[51] Int. Cl.$^3$ .......................................... G01B 13/06
[52] U.S. Cl. .................................................. 73/37.6
[58] Field of Search ..................... 73/37.6, 37.7, 37.5

[56] References Cited

U.S. PATENT DOCUMENTS

| 3,194,055 | 7/1965 | Knobel | 73/37.7 X |
| 3,321,838 | 5/1967 | Albertson, Jr. | 73/37.5 X |
| 3,495,442 | 2/1970 | Rejsa | 73/37.6 |
| 3,884,076 | 5/1975 | Studer | 73/37.6 |
| 4,031,741 | 6/1977 | Schaming | 73/37.7 |
| 4,070,902 | 1/1978 | Knobel | 73/37.5 |

FOREIGN PATENT DOCUMENTS

| 1623202 | 12/1970 | Fed. Rep. of Germany . |
| 2028755 | 12/1971 | Fed. Rep. of Germany . |
| 5238244 | 9/1975 | Japan . |
| 128332 | 5/1950 | Sweden | 73/37.6 |
| 458005 | 4/1975 | U.S.S.R. | 73/37.5 |

Primary Examiner—Charles A. Ruehl
Assistant Examiner—Joseph W. Roskos
Attorney, Agent, or Firm—Ostrolenk, Faber, Gerb & Soffen

[57] ABSTRACT

A self-stabilizing position sensor for pneumatic measurement. A nozzle, mounted on one end of a tube, blows compressed air directly against a surface to be sensed. The tube has on its other end an outlet member with restricting openings beyond which is a throttle plate, and a member for controlling a known, essentially frictionless position sensor. The midsection of the tube extends through a compressed-air chamber and through the chamber end walls where the tube is born on air cushions. The portion of the tube inside said chamber has inlet holes for compressed air flowing towards and through the nozzle or reversely towards and through said openings. By virtue of a gap, the throttle plate constitutes a non-sealing cover for a second chamber where the openings open. The sum of the pressure acting on the throttle plate, within the tube and on the free outer surface of the nozzle is balanced by the weight of the movable means consisting of nozzle, tube, outlet member, throttle plate and controlling member, and by elastic or magnetic forces acting on the movable member.

11 Claims, 2 Drawing Figures

SELF-STABILIZING PNEUMATIC POSITION SENSOR

The invention relates to a self-stabilizing, pneumatic position sensor for measurement using a nozzle which blows against a surface to be sensed by means of the position sensor.

It is known to directly measure distance pneumatically, or more specifically, differences in length, position or distance, by means of a stationary blowing nozzle. The changes in pressure in the nozzle are measured, as they occur with change in distance from the object to be measured (the above-mentioned surface), i.e. the relative position and/or its changes are measured. It is most common to use compressed air with a pressure of about 0.15 MPa (1.5 kg/cm$^2$) or less. For indirect pneumatic distance measurement, a mechanical sensing tip is used which controls a pneumatic measuring valve. It is true that one can achieve a very high accuracy or measurement, but a mechanical sensor tip can have a negative effect on the surface to be measured, and vice versa, and it is directly unsuitable for sensing of rough surfaces or surfaces where the distance changes greatly or suddenly in dynamic sensing, i.e. sensing during relative movement between the surface and the measuring tip in another direction than the axial direction (direction of movement) of the measuring tip.

The invention according to the main claim makes it possible to make a very accurate and inexpensive direct measuring pneumatic position sensor without valves and with a single moving member which can have air cushion bearings. In other words, it is practically frictionless.

An example of a position sensor according to the invention is described in connection with the accompanying drawings.

Figure 1:
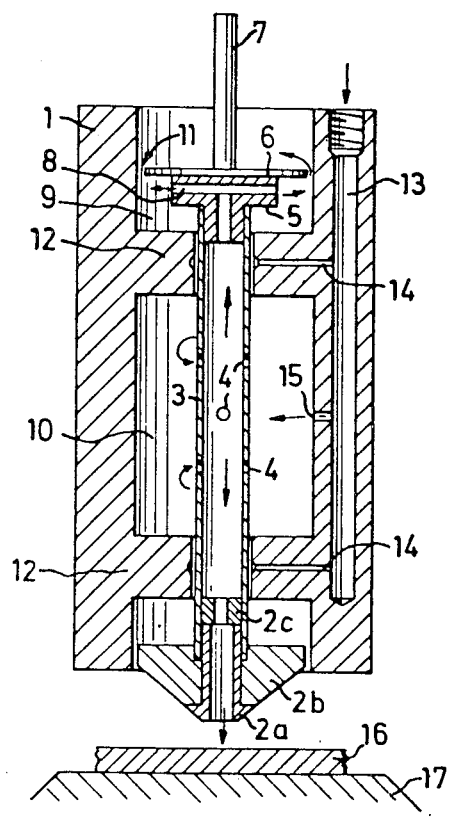
FIG. 1 shows a longitudinal section of the position sensor.

The drawings show the position sensor schematically without external attachments, but in approximately its correct proportions, except as regards the air ducts whose dimensions are given by way of example below.

The position sensor consists of a body 1 which is stationary during measurement, and a movable measuring means. This means consists of a nozzle 2a, 2b, 2c which is fastened in one end of a tube 3 with five holes 4, and of an air outlet member 5 which is fastened in the other end of the tube 3 and carries a choke or throttle plate 6 and a rod 7. The member 5, which can be rotationally symmetrical, contains a central outlet duct with, in this example, two side branches 8 with outlet openings to a chamber 9 between the throttle plate 6 and the body 1. Between this chamber 9 and the outside air (the atmosphere) there is a narrow annular gap 11.

Thus the movable means 2–8 of the position sensor can be rotationally symmetrical in its entirety, as well as all the component parts thereof, if one disregards the holes 4 and the duct 8, which are suitably cylindrical in themselves. It has been stated above that the nozzle 2 and the outlet member 5 are fastened in the tube 3, which does not prevent them from being adjustable axially (or even rotatable) in relation to each other and to the tube 3. The nozzle 2 is shown here composed of a measuring tip 2a provided with a coaxial blow duct and opening, a reinforced deflector 2b and a restriction 2c, the deflector 2b protecting the measuring tip and preventing too great a lateral load on the entire movable means 2–8 if the measuring tip is acted on laterally, e.g. by a projection on the object 16 to be measured by the position sensor. This object to be measured can be a web of paper, plastic or metal or the like which passes beneath the measuring tip 2a and slides on a stationary surface 17, so that the thickness and/or surface evenness of the web 16 can be measured and checked by means of the position sensor. The position sensor is presumed to be stationary, i.e. immobile during measurement but preferably at least axially adjustable above the object 16 to be measured and can be provided with, for example, a conical or cylindrical downward extension of the body in such a way that the nozzle 2 is surrounded at a distance by a collar (not shown) as additional protection for the nozzle and the entire measuring tip. Two of the members 2a, 2b and 2c, especially 2a and 2c, but possibly all three, can be made in a single piece of material.

If a wide web of material, especially a web of paper in a paper machine, is fed on a support 17 (which can be a rotating roller) under the nozzle 2 and is also to be sensed transversely to the direction of feed, the body of the position sensor can be moved back and forth along a guide (not shown) so that the web is sensed in a zig-zag pattern. Such arrangements are well known. Alternatively, several stationary position sensors can be placed across the direction of feed.

The midsection of the tube 3 of the movable means is located in a chamber 10 in the body 1, which is axially limited by two intermediate walls 12 each with an air cushion bearing for the tube 3. Compressed air is supplied via a compressed air duct 13 and two side ducts 14 to said bearings, so that the tube 3 is born in a manner known per se practically without friction. An additional side duct 15 also conducts compressed air to the chamber 10, with the side duct 15 acting as a throttle point to reduce the pressure of the air supplied through the duct 13 from 100–300 kPa, e.g. 150 kPa, to a significantly lower suitable value. The duct 15 which is quite short (about 2 mm), can have a diameter of about 1.2 mm at said pressure.

The air pressure in the chamber 10 flows through the holes 4 into the tube 3. In the present example, the tube is provided with five such holes 4 each with a diameter of 2.5 mm. Inside the tube, the air flows to the two ends of the tube and flows out at one end through the restriction 2c (interior diameter about 1.5 mm) and the nozzle 2a towards the object to be measured 16, and at the other end through ducts 8 in the member 5, through the chamber 9 and the annular gap 11.

It is assumed in the following discussion that the position sensor is placed above the object 16 to be measured with the nozzle 2 directed downwards, so that the axis of the position sensor is vertical or deviates at most 45° from vertical. But the vertical orientation should be the most common one in practice. Certain additional steps and members would be required in order to use the position sensor shown in the drawing and described here in an orientation greatly deviating from the vertical downwardly directed orientation. The possibility of using a position sensor in an orientation other than vertically downward is taken up briefly further on. The axis of the air stream directed against the measured object 16 (in this example this axis is the longitudinal axis of the sensor) should always form approximately a right-angle with the surface of the object to be measured, however.

The inlet (indicated with an arrow) of the compressed air duct 13 is provided with a connection (not shown) for a pipe or hose, e.g. a pipe socket or nipple, and compressed air under suitable pressure of about between 100 to 200 kPa is introduced through the inlet into the duct 13, from which the air passes through the pressure reducing side duct 15. A portion of the air, however, passes directly from duct 13 and through the side ducts 14 to the air-cushion bearings of the tube 3 in the intermediate walls 12. The major portion of the compressed air, continues through duct 15 to the chamber 10 and, as is indicated by the curved arrows, through the holes 4 to the interior of the tube 3. A portion of the compressed air in the tube 3 flows downwards through the restriction 2c and through the tip 2a towards the object 16. The rest of the compressed air in the tube 3 flows upwards through the outlet member 5, exiting from ducts 8 into the chamber 9, wherefrom it continues past the annular gap 11 into the free air or possibly to a space with a pressure different from atmospheric pressure.

The plate 6 is thus urged upwards by the pressure built up in the chamber 9 and thus opposes the weight of the movable means 2–8. The air stream exiting from the measuring tip 2a acts both upwards and downwards on the means 2–8 with a certain resultant force, which depends both on the form and size of the lower surface of the nozzle 2 and the distance between the opening of the measuring tip 2a and the top surface of the object 16, which is hit by the stream. Of particular importance is the negative pressure created under the measuring tip, which acts on the movable means with a downwardly directed suctional force.

Instead of compressed air, another compressed gas can, of course, be used, especially an inert gas such as carbon dioxide, nitrogen or argon, in the case, for example, that the object 16 or its surface has such properties or temperature that it would be affected mechanically or chemically by an air stream, which can be damaging due to its locally cooling or oxidizing effect or by deformation of a very soft object 16. Sensitive measuring objects, e.g. layers of glue, can be provided with a protective sheet or coating of known thickness.

In the example shown, here the movable means is acted on downwards by its own weight, but upwards by the sum of three upwardly acting pneumatic forces, namely the force mentioned acting on the measuring tip 2, the force acting on the interior upper end surface of the tube 3 and the force acting on the throttle plate 6, minus a suction force acting on the measuring tip due to a negative pressure space under the measuring tip. If all of the component dimensions are chosen correctly, as well as the pressure and the weight of the movable means, the upwardly and downwardly directed forces will balance out each other so that the movable means remains stationary in a position determined by the distance between the opening of the measuring tip and the surface of the object 16. If this object is moved laterally past the measuring tip and its surface is uneven, or if the object is moved vertically, then the means 2–8 performs the corresponding vertical axial movements. Said suctional force serves to stabilize the movable means so that it does not begin to vibrate.

The following examples of certain dimensions in connection with those already mentioned can be of interest: The inner diameter of chamber 9 (and of chamber 10) is 25 mm, and the throttle plate has a diameter of 24.5±0.05 mm. The ducts 8, or in any case their openings, have a diameter of 1.8 mm, the outer and inner diameters of the tube 3 are 10.0 and 8 mm respectively, the diameters of the holes 4 and 15 are 2.5 and 1.2 mm respectively, the inner diameter of the restriction 2c is 1.5 mm, the inner diameter of the measuring tip 2a is 4.0 mm, and the axial length of the body 1 is about 100 mm.

Said equilibrium of forces is also dependent on the pressure of the compressed air supplied through the duct 13, but the pressure is not critical and need not be stabilized, although fairly constant pressure is desirable if great precision is desired. If the measuring distance between the measuring tip and the surface of the object 16 changes, the movable means will follow this movement while maintaining the distance with an accuracy of ±1 micron. This means, for example that one can use the position sensor as a temperature sensor by sensing expansions and position variations of an object due to temperature changes. The position sensor can also have a second sensor or measuring means.

Tests with a measured object 16 in the form of a web of paper have shown that measuring results and measuring accuracy were practically independent of any movement of the paper at paper speeds from 0 to 20 m/sec. For technical reasons, higher speeds than 20 m/sec. (72 km/h) were not tested.

Since the weight of the movable means 2–8 is constant, the downwardly directed force of gravity is also constant. There can be cases however where one does not desire this force to be constant, or where one wishes to reduce the weight of the movable means to a lower value than what is suitable with regard to design considerations. In this case a spring can be arranged which urges the means upwards or downwards, as the case may require, and which has the desired force and spring constant. It is possible that a non-linear spring characteristic can be suitable in certain cases. Springs or elastic washers, or the like, should be arranged, for example on each axially outwardly facing side of the intermediate walls 12, in order to absorb shocks which can occur when the movable means is suddenly moved to one end position either by careless handling or due to the measurement process itself.

Nothing has been said in the above about how the position of the movable means and its movements are to be indicated or converted into signals without affecting the movable means with an opposite force, e.g. friction. An indication or signal production with practically no energy loss can be achieved by many different types of known means, which therefore need not be explained in detail. The position and movements of the movable means can be represented by electrical signals. In this case, the rod 7, which can also have the form of a band or the like instead of a rod, can act as or be provided with a ferromagnetic core or a magnetic screening element in an electrical inductive position sensor, which is well known per se, with an inductive bridge, differential transformer or inductively controllable high frequency oscillator, since even every small changes in frequency can be measured accurately. Alternatively, the rod 7 can be provided with a capacitor/electrode or a dielectric in a capacitive bridge, differential condensor or high frequency oscillator. The rod 7 can also constitute or be provided with a so-called flag (heat shield) in a bolometer (which contains shieldable thermistors or thermoelements which are subjected to heat radiation).

In addition to these and other possibilities for generating electrical signals, optical indication is also feasible in many cases. Probably the most simple case—since the relatively small mechanical movement is to be converted into a significant deflection—the rod 7 acts on a mirror 7, which deflects a so-called mirror sensor along a scale and/or a series of photocells. Alternatively, a beam of light can be screened off more or less by means of a screen with a grid of lines with segmentally varying thickness or spacing of a slit diaphragm on the rod, for example.

Another well-known possibility is to generate pneumatic signals by providing the rod with a valve disc or have it act as a slid in a pneumatic valve, especially in a measuring valve of the type which is well known for the indirect pneumatic measurement mentioned in the introduction, such as the known deltameter (cf. Karlebo Handbook, 11th edition, 1967, page 707 and 712–718, which also gives an example of inductive electric signal generation).

Fluidistors can be controlled in a similar manner by means of the rod 7. If the requirements of measuring sensitivity, accuracy, and mechanical sturdiness are not high, purely mechanical indication is possible, if the rod, for example, acts on one end of a swinging indicator pointer or the like, the pointer being journalled close to the place where the rod 7 acts on the indicator pointer so as to achieve a large lever ratio. Such an indicator can be made practically frictionless, as is known.

Photocells—in the broadest sense of the term—have already been mentioned. A known effective photoelectric signal generation is effected by the rod 7 directly or indirectly producing a varying screening off of a beam of light, which strikes the photocell or a row of photocells, since such a screening off can also be effected almost frictionlessly with known means which are sensitive to extremely small changes in position.

The invention is not limited to position sensors which must be directed vertically towards the object 16 with the measuring tip 2 directly above the object, even if this use is the most suitable one. If a position sensor according to the invention is to be used in a position which strongly deviates from the vertical, any appreciable friction in the bearings of the movable means in the intermediate walls 12 must be prevented. This can be accomplished by suitable air-cushion bearings for example, which are known per se, but with relatively high air pressure in these bearings, thus increasing the air leakage into the chambers 9 and 10, which in turn means that some of the dimensions given above must also be changed. Alternatively, the non-axial gravitational force component acting on the means 2–8 is compensated permanently or electromagnetically or by means of a pneumatic, preferably dynamic, force (a jet of compressed air or the like) directed at right angles to the axis of said means.

Finally, in the case where the position sensor is to be able to be used in the vertical position but with the measuring tip 2 pointing upwards towards an object 16 above the tip, the weight of the movable means acts together in the same direction with most of the pneumatic forces already mentioned.

Figure 2:
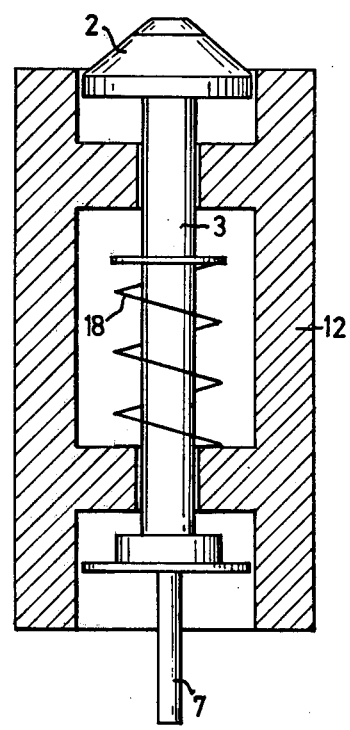
FIG. 2 shows schematically a variation thereof.

FIG. 2 is a schematic longitudinal section of a modification of the position sensor according to FIG. 1. The sensor according to FIG. 2 can completely agree with that described above according to FIG. 1 with the exception that it has in addition a compression spring 18 and a spring support on the outside of the tube 3. While the sensor according to FIG. 1 is intended to be used for sensing an object 16 beneath the nozzle 2, the sensor according to FIG. 2 is intended to sense an object above the nozzle and is therefore mounted upside-down in relation to the sensor according to FIG. 1. If the two sensors according to FIGS. 1 and 2 are mounted coaxially with their bodies 1 rigidly joined to each other so that there is a certain gap between the two nozzles, this pair of sensors can be used to measure the thickness of a sheet or foil of material such as paper, plastic, metal or the like.

The compression spring 18 is made in a known manner with such a spring constant and characteristic that, within the maximum range of movement of the movable means 2–8, for example at most 12 mm ($\frac{1}{2}$ in.), it acts on said means with a constant force upwards, and this force must be twice as great as the movable mean's own weight of, for example, 20 grams, provided that the two position sensors, with the exception of the spring 18 and the air pressures, are identical.

Instead of the spring 18, it is possible to use statically or dynamically acting pneumatic means (not shown) or permanent magnetic or electromagnetic means (not shown) for generating said upwardly directed force of 40 grams, for example. As is known, static pneumatic means refers to a pneumatic cylinder with piston, and dynamic pneumatic means refers to a stream of air for example.

As the situation may dictate, it can be advantageous to make the chamber 9 with a slightly conical inner wall which, if the position sensor and its nozzle are intended to point downwards, i.e. with the chamber 9 at the top, diverges somewhat towards the upper (as shown in the drawing) open end of the chamber 9. In certain other cases it can be suitable to make the chamber 9 with a slightly arched inside, the generatrix of which is slightly curved and concave, in such a way that the throttle plate 6 is normally in the position where the inner diameter of the chamber is greatest.

Finally, it should be mentioned that the throttle plate 6 and the annular gap 11 can be replaced with a bellows or thin membrane, e.g. a ring-corrugated thin metal membrane of the same type as in an aneroid barometer. The bellows should, unless other results are desired, exert the least possible resistance of spring force on the movable means 2–8 and contain one or preferably a plurality of openings with the same function and thus with in principle the same pneumatic resistance as the annular gap 11 described above.

Since the distance between the nozzle 2 and the surface of the object 16 pneumatically affects the balance of forces described earlier, the position sensor can be provided with means for manual and/or remote controlled or automatic adjustment of this distance within certain limits even during operation, with no mechanical connection with the movable measuring means 2–8 being necessary. This adjustment device can consist, for example of an air duct which from the space in the chamber 9 between the throttle plate 6 and the closest intermediate wall 12, leads to the outside atmosphere and has a variable cross section, e.g. by means of a known throttle device similar to a needle valve. Alternatively, the duct can consist of an axial groove in the inner wall of the chamber 9 and be variable by means of a type of axially displaceable slide of pin in the groove. Other possibilities exist as well. In those cases where the movable means 2–8 is acted on by a spring force, this force can be varied by means of an adjustment device for changing the tension of the spring. There are also other possibilities which hardly need to be described in more detail here.

What I claim is:

1. Pneumatic position indicator for measuring position by blowing a compressed gas against a surface to be sensed, the indicator comprising:
   means defining a closed chamber for being filled with compressed gas;
   a hollow, axially movable measuring means extending through the chamber; a compressed gas entrance hole into the measuring means and positioned on the measuring means to be within the chamber;
   a nozzle aimed for directing gas against a surface to be sensed, the nozzle communicating with the measuring means and being located outside the chamber at one side of the chamber;
   the measuring means having an exit opening that is located outside of the chamber at the other side of the chamber from the nozzle;
   an additional member attached to the measuring means and being movable together with the measuring means, the additional member being located on the side of the exit opening of the measuring means that is away from the chamber, and the additional member being shaped for having pressure applied thereto in view of the compressed gas flowing through the exit opening; means defining a gas leakage pathway located past the additional member for throttling the flow of gas from the exit opening past the additional member;
   whereby the moving means is acted upon to shift axially with respect to the chamber by a combination of gravity, the gas exiting through the nozzle, and the gas exiting through the exit opening applying pressure against the additional member and then exiting through the leakage pathway.

2. Position sensor according to claim 1, wherein the nozzle and the exit opening are provided with restricting points for the compressed gas to reduce the pressure.

3. The position indicator according to claim 1, further comprising additional force applying means for acting upon the moving means to move the moving means axially.

4. The position indicator of claim 1, wherein the means defining a leakage pathway comprises a second chamber having side walls which define a predetermined shaped opening through which the additional member may move; the additional member having a peripheral profile approximating the shape of the opening defined by the side walls of the second chamber, and the additional member peripheral profile being shaped with respect to the second chamber side walls for defining a narrow throttle gap past the additional member; the second chamber being closed at the end thereof that is closer to the exit opening and that is further from the additional member and the second chamber being open at the opposite end thereof, beyond the additional member.

5. The position indicator of claim 4, wherein the additional member comprises a plate having a periphery defining the peripheral profile of the additional member.

6. The position indicator of claim 5, wherein the additional member comprises a circular plate, and the side walls of the second chamber define a circular cylindrical opening through which the circular plate moves along with the moving means.

7. The position indicator of either of claims 1 or 4, wherein the means defining the first-mentioned compressed gas chamber comprises walls enclosing the first chamber, and the moving means passes through the walls in passing through the first chamber;
   axial bearings being defined in the walls of the first chamber for through passage of the moving means.

8. The position indicator of claim 7, wherein the bearings comprise gas cushion bearings including means for feeding compressed gas to the bearings.

9. The position indicator of claim 8, further comprising a pressure source for compressed gas for feeding compressed gas to the first chamber and to the air cushion bearings.

10. The position indicator of claim 9, wherein the bearings are disposed so that leaking gas from the air cushion bearings will leak into the first chamber; and from one of the bearings, the leaking gas will also leak into the leakage pathway.

11. The position indicator of claim 9, further comprising restrictors for regulating gas flow to the chamber and to the air cushion bearings.

* * * * *